June 3, 1969          H. C. RICE          3,447,833

PASSENGER RESTRAINING SYSTEM

Filed Sept. 13, 1967          Sheet 1 of 3

INVENTOR
HERBERT C. RICE

BY Barnard, McGlynn, & Reising

ATTORNEYS

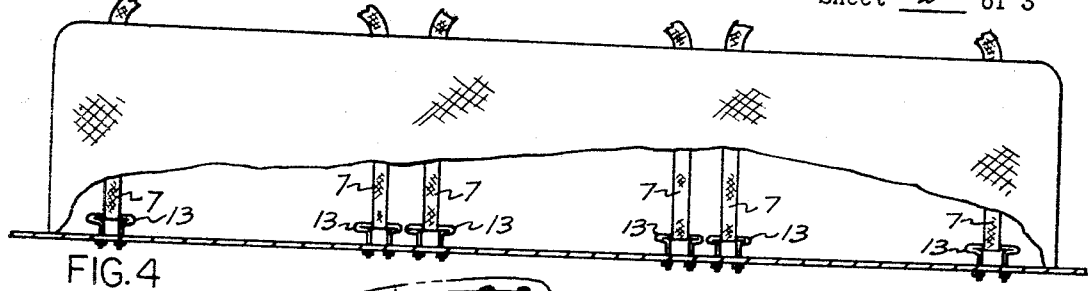
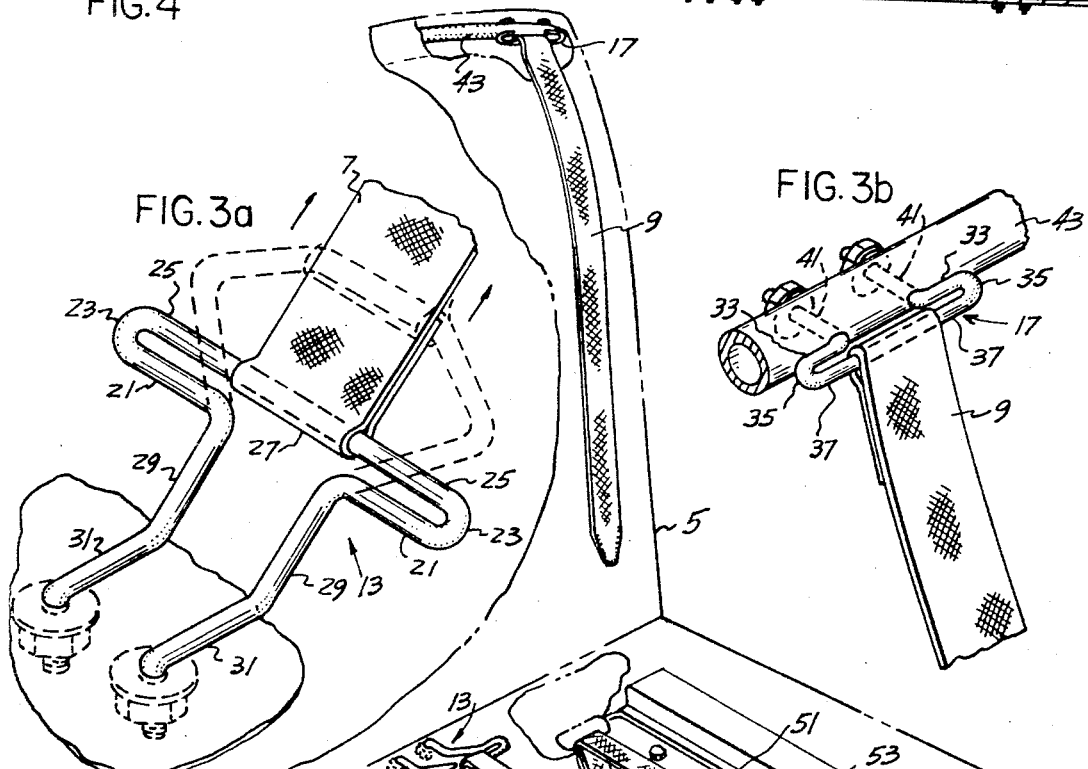
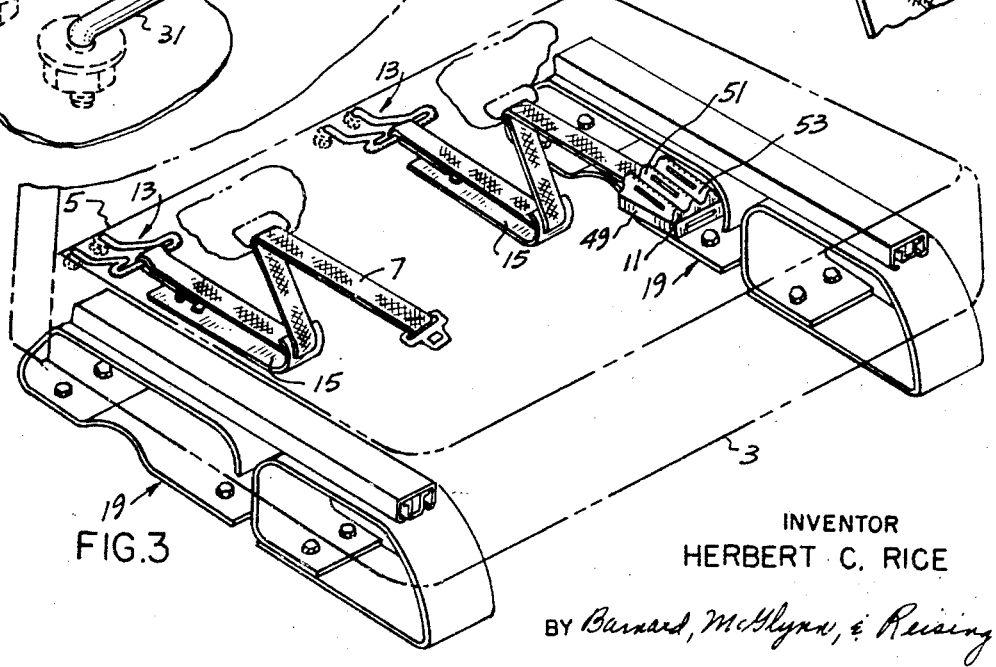

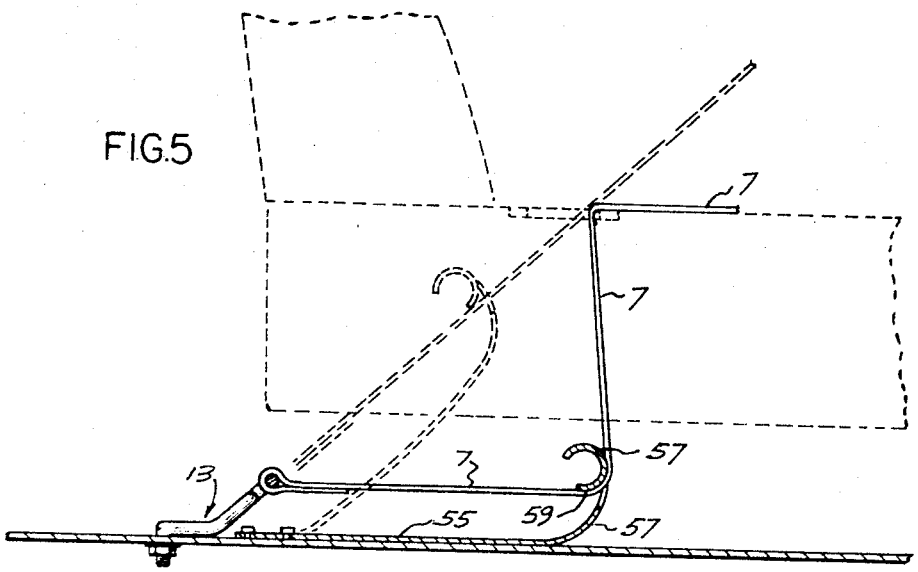
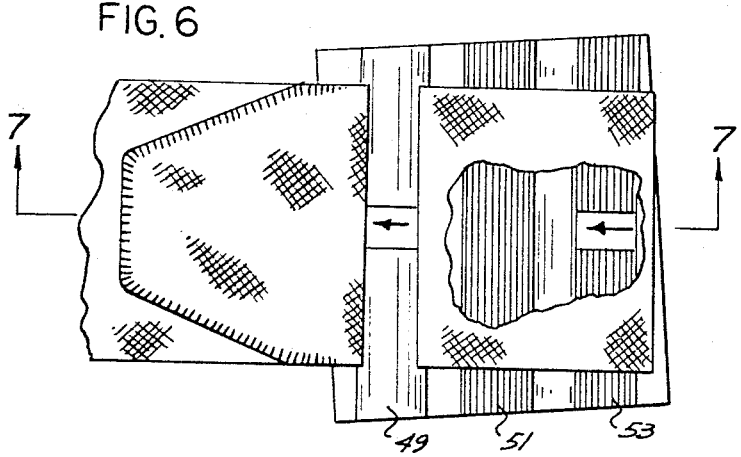
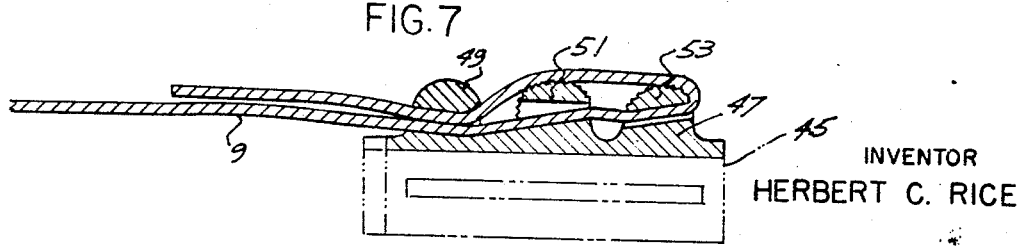

United States Patent Office
3,447,833
Patented June 3, 1969

3,447,833
PASSENGER RESTRAINING SYSTEM
Herbert C. Rice, 16940 Log Cabin,
Detroit, Mich. 48203
Filed Sept. 13, 1967, Ser. No. 667,529
Int. Cl. B60r *21/10;* A62b *35/00*
U.S. Cl. 297—386          10 Claims

ABSTRACT OF THE DISCLOSURE

The subject matter of this invention is a passenger restraining system for smoothing out upon impact inertial forces and dissipating inertial energy by employing a unique anchorage. This anchorage in its preferred embodiment is formed from a bar and includes a pair of symmetrically disposed energy dissipating means including a pair of substantially parallel straight sections connected to a curved section. A restraining belt, for example, a shoulder belt is attached at one end to the anchorage whereby upon impact the curved sections open up to spread out inertial forces and dissipate inertial energy. Such anchorages can also be employed for lap belts. When both shoulder and lap belts are used, the shoulder belt anchorage is preferably attached to the back of the seat and one end of the shoulder belt is attached to this anchorage and the other end to the lap belt preferably by means of a combination lap belt-shoulder belt buckle employing the half-hitch principle. Further, the lap belt may be retracted when not in use by a pair of retractors formed from a resilient material.

---

Conventionally passenger restraining devices such as lap belts, shoulder belts and harnesses, are rigidly attached to either the floor or the roof of the vehicle. As a result, during a collision, large inertial forces are applied to the passenger by such restraining devices which forces themselves frequently result in injury. Further, such forces lead to stretching of the fabric of the restraining device thereby causing severe snapback. In copending patent application Ser. No. 639,709, the importance of anchoring a lap belt to an energy dissipating anchorage device for smoothing out inertial forces and dissipating inertial energy is discussed and a unique energy dissipating anchorage system is disclosed for smoothing out inertial forces and dissipating inertial energy developed by the restrained passenger upon impact. This anchorage system, while well adapted for use in connection with lap belts, is not readily adaptable for use with upper body restraining devices such as shoulder belts or harnesses. There is therefore, a great need in the vehicular safety art for such an anchorage. The present invention fulfills this need.

Further, shoulder belts or harnesses are anchored to the roof of an automobile rather than at the top of the back of the seat because it is believed that conventional vehicular seats do not have sufficient strength to withstand the inertial forces placed upon it during a severe collision. However, for appearances sake, it is most desirable to have such devices attached to the seat rather than to the roof. In order to do so, either the seat itself must undergo expensive strengthening or the tremendous inertial forces generated during a collision owing to a rigid anchorage system must be substantially reduced. An anchorage system for smoothing out inertial forces and dissipating inertial energy would permit fastening upper body restraining devices to the seat. Therefore, the present invention materially aids in the interior esthetics of vehicles having such restraining devices.

Briefly, the system for smoothing out and dissipating inertial energy includes in the preferred embodiment an anchorage formed from a bar preferably of mild steel having a pair of symmetrically disposed expandable energy dissipating means, such means being connected to a straight portion for yieldably anchoring a passenger restraining device, and further each of such means is connected to a means for securing them to the vehicle. Preferably, each energy dissipating means comprises a pair of parallel straight sections connected to a curved section. The curved section upon impact is opened up and by so acting inertial energy is dissipated and the inertial force are smoothed out.

For use with a lap belt, it is preferred that two such anchorages be employed for each lap belt. However, for a shoulder belt, it has been found that since one end of the belt may be atached to the lap belt, only one such anchorage need be employed and it is preferably mounted on the top of the back of the seat. Further, to buckle the shoulder belt to the lap belt a simple and unique buckle unit to be described herein may be employed, and finally to retract the lap belt when it is not in use a unique set of retractors to be described herein may be employed.

The invention may be better understood by reference to the drawings and the detailed description which follows:

FIGURE 3 is a perspective view of the restraining system utilizing the invention;

FIGURE 3a is an enlarged perspective view of a lap belt energy dissipating expandable anchorage;

FIGURE 3b is an enlarged perspective view of a shoulder belt energy dissipating expandable anchorage;

FIGURE 4 is a schematic view showing the arrangement of lap belts and energy dissipating expandable anchorages for a three belted standard automotive seat;

FIGURE 5 is a cross-section through line 5—5 of FIGURE 3;

FIGURE 6 is a top perspective view of the lap belt-shoulder belt buckle; and

FIGURE 7 is a cross-section through line 7—7 of FIGURE 6.

Figure 1:
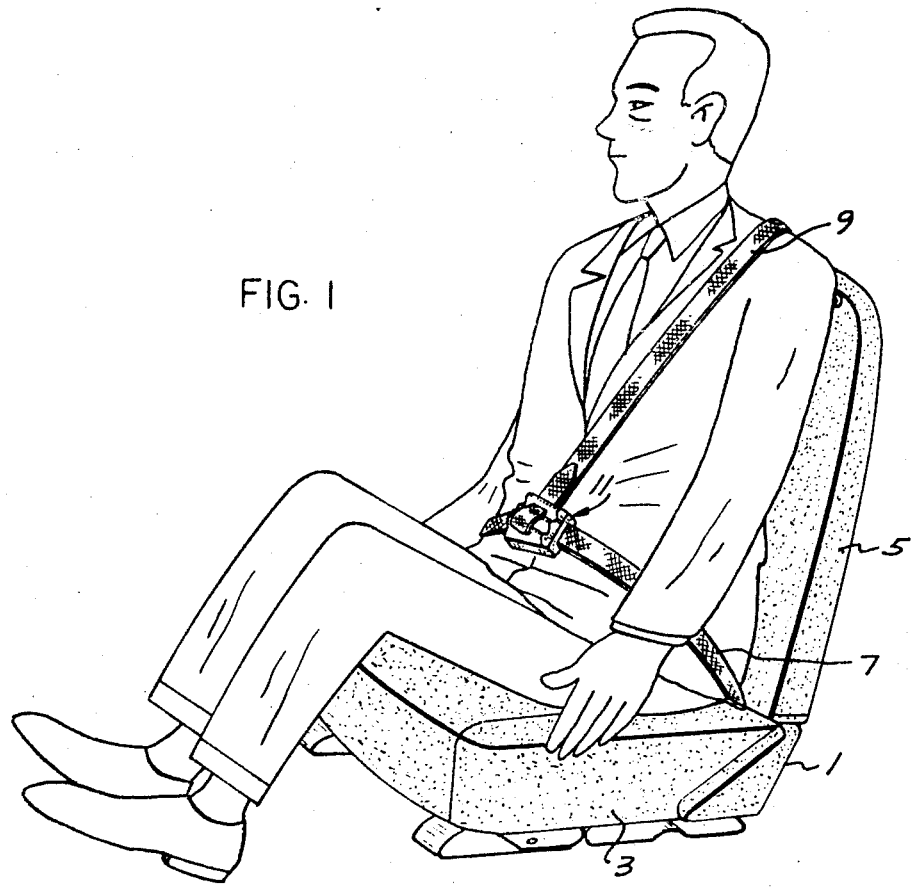
FIGURE 1 is a perspective view of a passenger restrained in a bucket seat by both a lap belt and a shoulder belt utilizing the invention.
Figure 2:
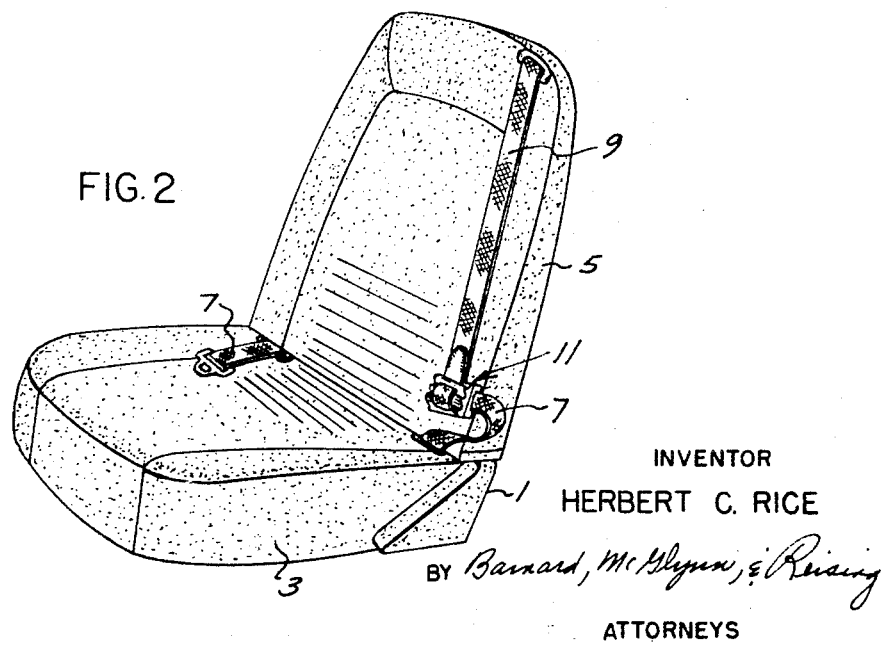
FIGURE 2 is a perspective view of a bucket seat without a passenger having both lap and shoulder belts utilizing the invention.

With reference to FIGURES 1 and 2 there is shown therein an automotive bucket seat 1 having a seat portion 3 and a back portion 5. The passenger is restrained by means of a lap belt 7 and shoulder belt 9, shoulder belt 9 being attached to the top of the back 5 of seat 1. Both shoulder belt 9 and lap belt 7 are buckled by means of combination lap belt-shoulder belt buckle 11. Although the invention is described with reference to shoulder belt 9, it is apparent that it may be readily adapted for use with a shoulder harness.

With reference to FIGURES 3, 3a, and 3b there is shown a pair of lap belt energy dissipating anchorages 13 secured to the floor of the automobile. Both strap portions of lap belt 7 are attached at one end to an anchorage 13. Each strap is operated in conjunction with a pair of lap belt retractors 15 which operate in a manner more fully described in connection with FIGURE 5. Shoulder belt 9 is shown attached at one end to energy dissipating anchorage 17. Seat support structures are shown at 19 and are of the type described in the aforementioned copending application.

Turning now more particularly to anchorage 13, with reference to FIGURE 3a, there is shown a structure formed from a bar, preferably of mild steel, having a pair of energy dissipating expandable means consisting of substantially parallel substantially equal straight sections 21 and 25 connected by curved section 23. These symmetrically disposed energy dissipating expandable means are connected together by straight section 27 which is adapted for having one end of the fabric of lap belt 7 attached thereto. Each such means is attached to the floor of an automobile by means of leg portions each having a straight section 29 connected to a straight section 31 at about a 30° angle with respect to each other. Straight sections 31 lay along the floor of the automobile and are bolted at one end to the floor. The approximately 30° angle is used because in normal use a lap belt forms an angle that is approximately 30° with respect to the floor. While structures employing only one energy dissipating expandable means are within the scope of this invention, it is clearly preferred to use two symmetrically disposed such means. Further, other structures which are capable of expansion and energy dissipation other than a loop type structure composed of a pair substantially parallel portions connected together by a curved portion may be used. For example, straight sections 21 and 25 need not be made parallel to each other. However, any such deviation will limit for a given length of section 21 and 25, the amount of deformation possible.

In operation, a force applied to straight portion 27 will open up curved portions 23, as shown in FIGURE 3a, so that straight portion 27 is yieldably moved forward and upward upon impact while the inertial energy of the belted passenger is being dissipated as the energy necessary to distort the energy dissipating expandable means. Thus, the inertial forces are both smoothed out and inertial energy is dissipated. Further, by placing straight sections 31 along the floor, stresses are lessened on the bolts which fasten the energy dissipating means to the floor of the vehicle.

With respect to the shoulder belt anchorage 17, its function and operation is similar to that previously described for lap belt anchorage 13. Again there is a pair of symmetrically disposed energy dissipating expandable means consisting of substantially parallel substantially equal straight sections 33 and 37 joined to curved section 35, and the energy dissipating expandable means are connected together by straight section 39, which section is used to attach one end of the shoulder belt. The energy dissipating means are then bolted to the top of back 5 by means of leg portions in the form of straight sections 41 extending through seat support tubing 43. Preferably, shoulder belt 9 is fastened at one end to lap belt 7 rather than to the floor because lap belt 7 is itself yieldable and further because less belt fabric is used which has the effect of decreasing the amount of potential energy for causing snapback stored in the fabric itself.

The attachment of the shoulder belt 19 to the lap belt 7 is preferably accomplished by a modification of a standard lap belt buckle more particularly shown in FIGURES 6 and 7. Buckle 11 comprises standard buckle section 45 on top of which is attached shoulder belt receiving section 47. Section 47 consists of three raised portions 49, 51, and 53 each having a length greater than the width of the fabric portion of belt 9. Each raised portion contains a slot that is adapted to enable the fabric portion of belt 9 to pass through. Serrations are used on the top sections of raised portions 51 and 53 for gripping the fabric. In operation, the fabric is slipped through all three slots, then doubles back gripping the top of portions 51 and 53 and finally passes through the slot of raised portion 49 for the second time forming thereby a secure fastening using the half-hitch principle.

To retract lap belt 7 when it is not in use, a pair of unique retractors 15 are employed. The operation of such retractors is shown particularly with reference to FIGURE 5. Retractor 15 consists of a piece of elastic type material such as spring steel having a straight section 55, a section bending upwards from section 55, preferably curved section 57, at one end of section 55, said curved section 57 having a slot and a curved lip 59 for smoothly guiding belt 7. The other end of straight section 55 contains means for fastening retractor 15 to the floor. In use straight portion 55 lies along the floor of the vehicle. One end of belt 7 may be attached to the floor as it would be in a conventional system or attached to an anchorage 13 as shown in FIGURES 3 and 5. The belt is then pulled through under the lip 59 to the slot and then up through the space between the seat and back. When not in use, a substantial portion of belt 7 is held on a line parallel to the floor. When in use, belt 7 is pulled forward by the passenger thereby pulling upward retractor 15 from the floor until as a limit the belt 7 forms a straight line from its anchored position to the seat. Since, as is obvious from elementary geometry, the amount of belt from the anchorage point to the seat is considerably reduced when the belt is in use, retractors 15 provide a simple and unique method for retracting a lap belt.

The above described system is simple and inexpensive. Yet it nevertheless is capable of adequately restraining a passenger while at the same time dissipating during a crash substantial amounts of inertial energy while smoothing out the inertial forces and hence considerably reducing injuries and fatalities.

What is claimed is:

1. A lap belt retractor system comprising at least one retractor formed from an elastic type material including a straight section adapted to be fastened at one end to a vehicular floor, said straight section being adapted so as to be substantially parallel with the floor of a vehicle, and a second section connected at the other end of said straight section forming an angle with said straight sections, said second section having a slot adapted to receive a lap belt and a lip adapted to guide said belt through said slot.

2. An energy dissipating anchorage for passenger restraining belts comprising: a pair of spaced leg portions each having one end adapted to be mounted on a support and its other end adapted to project from the support; a first integral straight section extending angularly from said other end of one of said leg portions in a direction away from the axis of the other of said leg portions; a second integral straight section extending angularly from said other end of the other leg portion in a direction away from the axis of said one leg portion; a third integral straight section extending angularly from said first straight section in a direction toward the axis of said other leg portion; a fourth integral straight section extending angularly from said second straight section in a direction toward the axis of said one leg portion; and a fifth integral straight section extending between the ends of said third and fourth straight sections across the space between said leg portions for engagement by a passenger restraining belt.

3. An energy dissipating anchorage as claimed in claim 2 wherein said first and second straight portion extend substantially normally from their respective leg portions.

4. An energy dissipating anchorage as claimed in claim 3 wherein said third, fourth and fifth straight sections are in substantial coaxial alignment with each other and are each substantially parallel to said first and second straight portions.

5. An energy dissipating anchorage as claimed in claim 4 wherein said leg portions are parallel to each other.

6. An energy dissipating anchorage as claimed in claim 5 wherein said leg portion each comprise a pair of straight sections extending at an angle from each other.

7. A vehicle passenger restraining system comprising: a belt having one end adapted to be substantially immovably anchored to a portion of a vehicle structure and a free end adapted to be releasably secured in an operative position to restrain a passenger; a retractor for retracting the free end of the belt to an out-of-use position when it is released from its operative position; said retractor comprising; an elongated strip of resilient material adapted to be secured at one end to a portion of a vehicle structure with the other end being resiliently movable relative to said one end, and means on said other end for engaging the belt intermediate the ends thereof such that movement of the free end of the belt to its operative position causes said other end of the retractor to bend about said one end and resiliently bias the free end of the belt to its out-of-use position.

8. A buckle for a vehicle passenger restraining system including a lap belt and a shoulder belt, said buckle comprising: a lap belt buckle section having an axial slot for receiving one end of a lap belt; and a shoulder belt section on the upper side of the lap belt section, said shoulder belt section including a plurality of raised members extending at an angle to said axial slot, said raised members each having a shoulder belt receiving slot permitting the shoulder belt to pass through said slots and doubled back over one of the raised members and through the slot of another of the raised members.

9. A buckle as claimed in claim 8 wherein at least said one of said raised members is serrated on its upper surface for gripping the shoulder belt.

10. A buckle as claimed in claim 8 wherein said shoulder belt section includes three parallel raised members on the upper portion of the lap belt section with a shoulder belt receiving slot in each raised member, and wherein two of said raised members have serrated upper surfaces.

References Cited

UNITED STATES PATENTS

| | | | |
|---|---|---|---|
| 2,189,574 | 2/1940 | Anderson | 24—198 |
| 2,316,846 | 4/1943 | Diebold | 24—200 |
| 2,649,637 | 8/1953 | Hodge | 24—200 |
| 3,103,048 | 9/1963 | Johansson | 24—198 X |
| 3,106,989 | 10/1963 | Fuchs | 297—386 X |
| 3,126,072 | 3/1964 | Johansson | 297—386 X |
| 3,198,288 | 8/1965 | Presunka | 297—386 X |
| 3,218,104 | 11/1965 | Putman | 297—389 |
| 3,219,361 | 11/1965 | Brown | 280—150 |
| 3,361,475 | 1/1968 | Villiers | 297—386 |
| 3,369,842 | 2/1968 | Adams et al. | 297—389 |

JAMES T. McCALL, *Primary Examiner.*

U.S. Cl. X.R.

297—388, 389; 188—1; 24—197